United States Patent Office 2,709,679
Patented May 31, 1955

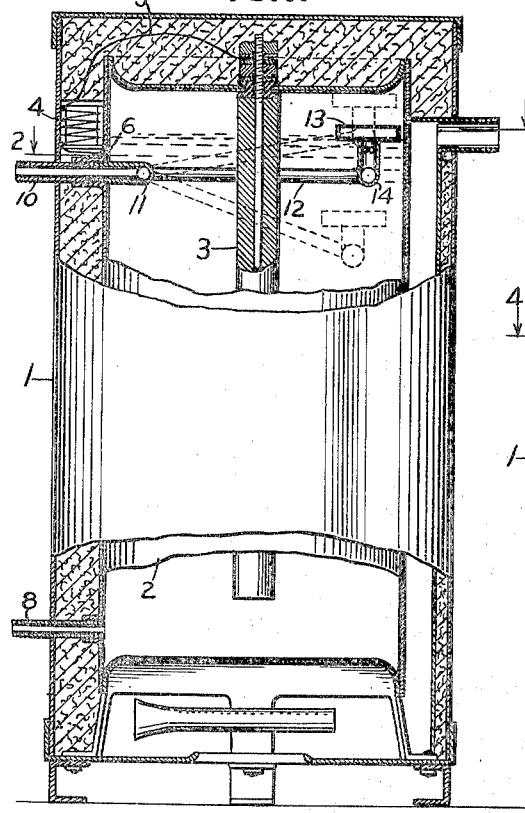
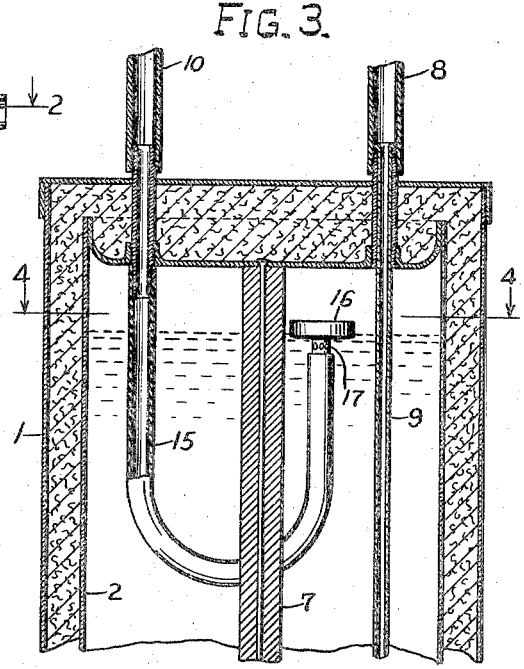
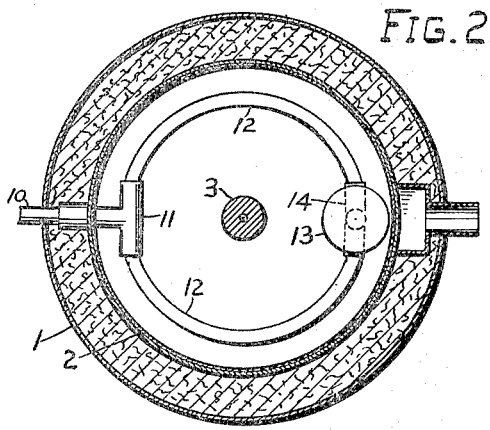
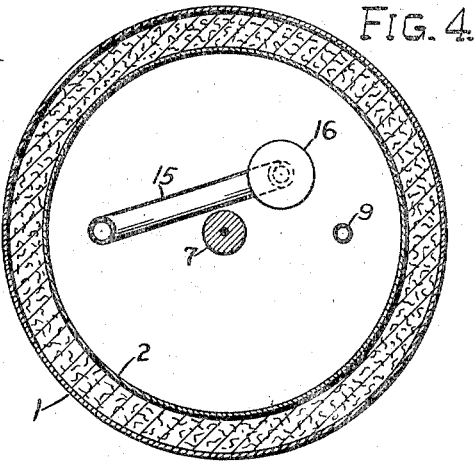
INVENTOR.
Orrin E. Andrus
BY Andrus & Seeales
ATTORNEYS.

2,709,679

CATHODICALLY PROTECTED WATER HEATER STORAGE TANK WITH FLOATING OUTLET

Orrin E. Andrus, Milwaukee, Wis., assignor to A. O. Smith Corporation, Milwaukee, Wis., a corporation of New York Application August 18, 1952, Serial No. 305,092

5 Claims. (Cl. 204—196)

This invention relates to domestic cathodically protected water heater storage tanks with floating outlets.

It has been found that where domestic cathodically protected water heater storage tanks lie dormant from use, i. e. where substantially no water is withdrawn from the tank, for a substantial period of time, it is possible for hydrogen gas to accumulate at the top of the tank by reason of continued electro-chemical and chemical action within the tank.

Where galvanized tanks are cathodically protected as with a sacrificial anode of magnesium alloy or the like, the volume of hydrogen thus accumulated at operating pressures may be of the order of several gallons. However, where glass lined tanks are cathodically protected either with sacrificial anodes or non-sacrificial anodes, a much lower amount of hydrogen is generated for a like period of time and it has been customary to provide a sufficient additional space at the top of the tank above the hot water outlet for the accumulation of such excess hydrogen as may be generated in a dormant period of from two to four weeks.

In water heaters it is desirable to provide the hot water outlet as near to the top of the tank as possible since any tank space above the outlet is not considered in determining the hot water capacity of the tank.

Any hydrogen accumulating at the top of the tank in a galvanized tank will pass into the outlet pipe and will ultimately be discharged from the faucet as a slug of hydrogen. Likewise, where a family may be away from home for several months it is possible that with a glass lined tank the small space provided for the accumulation of hydrogen above the mouth of the outlet pipe will more than fill with hydrogen gas and some of the hydrogen will enter the outlet pipe for later discharge as a slug from the faucet.

Discharge of substantial amounts of hydrogen gas at the faucet may be dangerous if ignited. If slugs of hydrogen are discharged into a substantially closed clothes washer or dish washer it may be possible to obtain a readily combustible or even explosive mixture of hydrogen and air which may be ignited by the spark from an automatic switch.

The present invention has for its principal object the prevention of the passing of slugs of hydrogen into the outlet pipe even under abnormal conditions of accumulation of excess hydrogen.

Another object of the invention is to provide for the accumulation and storage of very substantial amounts of hydrogen, enough to accommodate idle periods of several months for the tank.

Another object is to provide a hydrogen storage space at the top of the tank without materially reducing the rated hot water capacity of the heater.

An embodiment of the invention is illustrated in the accompanying drawing in which:

Figure 1 is a side elevation of a domestic water heater with parts broken away and sectioned to show the tank and one form of floating outlet therefor;

Fig. 2 is a horizontal section of the tank taken on line 2—2 of Fig. 1;

Fig. 3 is a detail vertical central section of the upper end of a tank showing another form of floating outlet therefor; and Fig. 4 is a horizontal section of the tank taken on line 4—4 of Fig. 3.

The water heater 1 has a water storage tank 2 which may be glass lined for protection from corrosion as shown in Figs. 1 and 2, or which may be galvanized as shown in Figs. 3 and 4.

The wall of tank 2 may be cathodically protected by means of a non-sacrificial anode 3 suspended within the tank and insulated from the tank wall and an external source of direct current potential such as the thermopile 4 having its positive terminal 5 connected to the anode 3 and its negative terminal 6 connected to the tank wall, as illustrated in Figure 1, or by means of a sacrificial anode 7 of magnesium alloy or the like secured to the top of the tank, as illustrated in Figs. 3 and 4.

The tank 2 has an inlet opening 8 for supplying cold water thereto and which may be in the side of the tank near the bottom as shown in Figure 1 or in the top of the tank as shown in Fig. 3. Where the inlet 8 is in the top of the tank a suitable dip-tube 9 is suspended therefrom to discharge the cold water near to the bottom of the tank and avoid undesirable mixing of cold and hot water.

The tank 2 has an outlet opening 10 for withdrawing hot water therefrom and which may be in the side of the tank as shown in Figs. 1 and 2, or in the top of the tank as shown in Figs. 3 and 4.

Both the inlet opening 8 and outlet opening 10 have suitable spuds for securing pipes thereto.

In employing the heaters described above hydrogen will be generated or evolved at the cathode areas of exposed tank wall by reason of the electro-chemical action produced by the flow of current to the cathode, and in the case of the sacrificial anode additional hydrogen will be generated or evolved at the anode by reason of local attack upon the anode.

In the case of galvanized tanks a much faster generation of hydrogen is encountered than in the case of glass lined tanks since substantially the entire inside surface area of the galvanized tank constitutes the cathode whereas only a very small cathode area is present in the glass lined tanks.

In the galvanized tanks a few days of idleness wherein water is not replaced in the tank will suffice to saturate the water with hydrogen and start an accumulation of excess hydrogen gas at the top of the tank. In the glass lined tanks an idle period of from one to two weeks and sometimes longer is required to saturate the water with hydrogen after which any excess hydrogen accumulates at the top of the tank.

According to the invention the safe period of idleness for the tank is lengthened very materially by providing a floating mouth for the outlet opening 10.

The floating mouth for outlet opening 10 in the construction shown in Figs. 1 and 2 comprises a T member 11 at the inner end of the spud for the opening and a flexible conduit 12 connected to each branch of the member and extending in a semicircle about the inside circumference of the tank to a float 13 on the opposite side of the tank from the outlet opening. The perforated T 14 to which the conduit 12 connects and through which hot water emits from the tank to outlet 10, is disposed beneath float 13 and is so positioned with respect to the float as to remain below the level of the water in the tank regardless of the position of the float.

The floating mouth for outlet opening 10 in the construction shown in Figs. 3 and 4 comprises a flexible conduit 15 secured at its upper end within the spud for opening 10 and extending downward within the tank with a reverse bend therein so that its free end extends upwardly to be carried by a float 16. The mouth 17 of conduit 15 is open to receive water just beneath float 16 and on account of the float the mouth 17 will always be disposed beneath the top of the water. The loop or bend in conduit 15 should be at a sufficient height in the tank to prevent contact of the conduit with the bottom of the tank when the float 16 lowers with its normal range of movement.

The flexible conduits 12 and 15 may be constructed of polyvinyl chloride or other suitable hot water resistant flexible synthetic material. Furthermore, the flexible conduit member may comprise a pivotally mounted stiff tubular member having its free end secured to the float to move up and down therewith without flexing of the tube. The floats 13 and 16 are preferably non-metallic and may have any suitable construction.

When hydrogen accumulates in the top of the tank as during an extended period of idleness of the heater, the water level lowers and the mouth of the outlet is lowered accordingly by the float riding upon the water.

During normal periods of use of the heater when water is replaced frequently in the tank the hydrogen previously accumulated gradually dissolves in the water and the water level and floats will rise accordingly.

The invention provides a variable storage space for substantial amounts of excess hydrogen gas, and avoids the danger of such gas being discharged through the outlet. Since in normal operation of the heater there will be no gas accumulation at the top of the tank the rated water capacity for the tank will be very near to the full capacity of the tank.

Various embodiments of the invention may be employed within the scope of the following claims.

I claim:

1. A cathodically protected water heater storage tank adapted to be employed in a domestic water system operating under pressure, comprising a tank having a cold water inlet and a hot water outlet connection near the top, means in said tank for protecting the same from corrosion and which means effects generation of gases within the tank tending to lower the water level therein to below said outlet connection, a flexible conduit extending inwardly of the tank from said connection, and a float carrying the free end of said conduit to dispose the open mouth thereof beneath the level of the water in the tank at all times.

2. The tank of claim 1 in which the float is non-metallic and the flexible conduit is of polyvinyl chloride synthetic material.

3. The tank of claim 1 in which the flexible conduit extends horizontally across the tank.

4. The tank of claim 1 in which the flexible conduit is suspended in a loop.

5. The tank of claim 1 in which the flexible conduit comprises a pivotal tubular member providing freedom of its free end to move up and down with the float.

References Cited in the file of this patent

UNITED STATES PATENTS

| | | |
|---|---|---|
| 137,357 | Fulton | Apr. 1, 1873 |

FOREIGN PATENTS

| | | |
|---|---|---|
| 626,789 | France | May 21, 1927 |